US00RE35922E

United States Patent [19]

Cuzzo et al.

[11] E Patent Number: Re. 35,922

[45] Reissued Date of Patent: Oct. 13, 1998

[54] METHOD AND APPARATUS FOR PREVENTING PRINT OVERRUNS

[75] Inventors: Clint Stephen Cuzzo, Boise, Id.; Thomas George Berge, Vancouver, Wash.

[73] Assignee: Hewlett-Packard Company, Palo Alto, Calif.

[21] Appl. No.: 215,796

[22] Filed: Mar. 14, 1994

Related U.S. Patent Documents

Reissue of:

[64] Patent No.: 5,129,049
Issued: Jul. 7, 1992
Appl. No.: 701,235
Filed: May 16, 1991

[51] Int. Cl.[6] ..... G06K 15/00

[52] U.S. Cl. ..... 395/113; 395/112

[58] Field of Search ..... 395/101, 112, 395/113, 115, 116, 164, 110, 150, 165; 346/154; 400/70, 74, 76; 358/467

[56] References Cited

U.S. PATENT DOCUMENTS 4,829,468 5/1989 Nonaka et al. ..... 395/113
5,050,100 9/1991 Damon et al. ..... 395/115
5,081,594 1/1992 Horsley ..... 395/150

*Primary Examiner*—Arthur G. Evans

[57] ABSTRACT

A page printer is described which divides each page of text, graphics, etc. into lateral page strips, each having an allocated page strip rasterization time (PSRT) based upon the printer's page print time. A method is described for assuring that a print mechanism in the printer has a strip of rasterized data waiting to be printed when a previous strip has been printed. The method comprises the steps of: determining a total rasterization execution time (RET) for all display commands in each strip; determining for a selected strip, if its RET exceeds the sum of PSRT and at least a prior strips idle strip rasterization time (ISRT), where ISRT equals PSRT less RET for the prior strip; prerasterizing the selected strip if its RET exceeds the aforestated sum and arranging it in a first queue; arranging the selected strip in a second queue if its RET does not exceed the aforestated sum; and transferring strips from the queues to a print mechanism and rasterizing strips from the second queue in the process of such transfer.

14 Claims, 4 Drawing Sheets

METHOD AND APPARATUS FOR PREVENTING PRINT OVERRUNS

Matter enclosed in heavy brackets [ ] appears in the original patent but forms no part of this reissue specification; matter printed in italics indicates the additions made by reissue.

FIELD OF THE INVENTION

This invention relates to printers and, more particularly, to a method and apparatus for assuring that a constant speed print mechanism has rasterized data awaiting printing.

BACKGROUND OF THE INVENTION

Page printers intrinsically capture an entire page image before any images are placed on paper. This enables substantial flexibility in the software that controls the printer, since it isn't necessary to compose a page from top to bottom. In printers which employ laser printers as the "print mechanism", data must be provided at a speed that is fast enough to keep up with paper that moves past the imaging drum. In such printers, formatting is either performed on the host computer, with large volumes of rasterized data shipped to the printer at high speed, or on a formatter within the printer. Since a laser printer mechanism operates at a constant speed, if rasterized data is not available to the print mechanism when a previous segment of data has been imprinted on the paper, a "print overrun" occurs and the page is not printable on the specific model printer. Further details on rasterization of data can be found in "Fundamentals of Interactive Computer Graphics" by Foley et al., published by Addison-Wesley Publishing Company, 1982.

To prevent print overruns, several algorithms are in common use. In the first, a full raster bit map of an entire page is stored so that the print mechanism always has rasterized data awaiting its action. Unfortunately, at 300 dots per inch resolution this technique requires approximately a megabyte of memory for each page. Because laser printers achieve their rated speeds by pipelining, more than one megabyte of memory is needed to run the printer at its rated speed. Otherwise, composition of a following page cannot begin until a prior page has been ejected to the output tray. The provision of such large amounts of memory adds significantly to the cost of a printer and is avoided, if possible.

A second algorithm constructs a display list and enables considerably less memory to be utilized in the print rasterization process. A page description is built in two steps: during formatting, a page description received from a host is converted into a series of simple commands, called display commands, that describe what must be printed. Once conversion of the page is complete, the second step prepares the display command list for printing. This step entails parsing through the display commands and rendering the described objects into a raster bitmap. At worst, only one full page raster bitmap is needed—even when pipelining—because the same memory is used for each page.

In order to further reduce the amount of memory, the display command list algorithm has seen a further development. Display commands are sorted according to their vertical position on the page. Once the sort has occurred, the page is divided into sections called page strips, and each page strip is passed, sequentially, to the print mechanism for printing. When display commands within a page strip are rendered into rasterized data at a fast enough pace, the same memory used to store a first page strip can be reused for a subsequent page strip further down the page (once the first page strip has been transferred to paper).

The Laser Jet III laser printer, manufactured by the assignee of this application, employs a display command list algorithm and utilizes three raster buffers. The first buffer is reused on the fourth strip of a page; the second buffer reused on the fifth strip, etc. For an eight page per minute printer, little time is left between the finishing of strip one and the time when strip four will be required by the print mechanism. If the strip is not delivered in time, a "print overrun" occurs. While the size of a raster buffer can be substantially increased to avoid a print overrun, this defeats the purpose of the display list algorithm, to wit, a reduction in the amount of memory required for the print action.

So long as a laser printer deals with normal text and raster graphics, a print overrun will ordinarily not occur. However, if vector graphics are employed, even a simple-looking page can outrun the capability of a processor to rasterize a display list rapidly enough to keep up with the printer mechanism.

It is therefore an object of this invention to provide an improved method and system for substantially reducing the possibility of print overruns in printers.

It is another object of this invention to provide an improved method for preventing print overruns which does not require added memory.

It is yet another object of this invention to provide an improved system for preventing print overruns that enables a printer to operate at a high page per minute print rate.

SUMMARY OF THE INVENTION

A page printer is described which divides each page of text, graphics, etc. into lateral page strips, each having an allocated page strip rasterization time (PSRT) based upon the printer's page print time. A method is described for assuring that a print mechanism in the printer has a strip of rasterized data waiting to be printed when a previous strip has been printed The method comprises the steps of: determining a total rasterization execution time (RET) for all display commands in each strip; determining for a selected strip, if its RET exceeds the sum of PSRT and at least a prior strip's idle strip rasterization time (ISRT), where ISRT equals PSRT less RET for the prior strip; prerasterizing the selected strip if its RET exceeds the aforestated sum and arranging it in a first queue; arranging the selected strip in a second queue if its RET does not exceed the aforestated sum; and transferring strips from the queues to a print mechanism and rasterizing strips from the second queue in the process of such transfer.

DETAILED DESCRIPTION OF THE INVENTION

Figure 1:
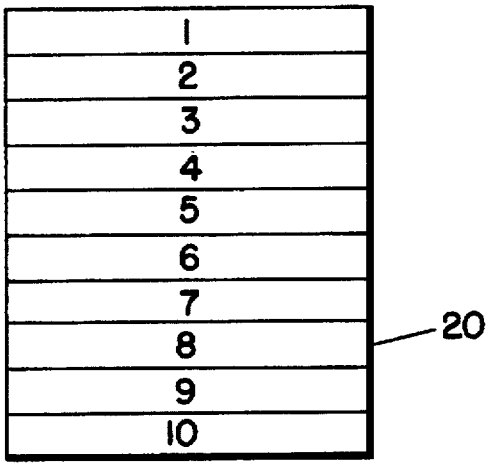
FIG. 1 shows an outline of a page and how it is broken into ten contiguous page strips.

Referring to FIG. 1, a page printer incorporating the invention treats a page 20 as a series of strips. As an example, ten strips are shown, each one covering a horizontal aspect of page 20. Text, graphics, etc. appearing in any one strip is treated separately during the processing of a page. If it is assumed that the page printer has the capability of producing eight pages per minute, each page will be produced in 7.5 seconds. Since there are ten strips, each strip is arbitrarily allocated a page strip rasterization time (PSRT) of 0.75 seconds. At a gross level, PSRT indicates the available time for processing (i.e., rasterizing) a series of display commands in a page strip. If rasterization occurs within PSRT, the page printer is able to maintain its specified page print rate. Clearly, the choice of ten strips is merely for exemplary purposes and other page strip allocations are contemplated.

Figure 2:
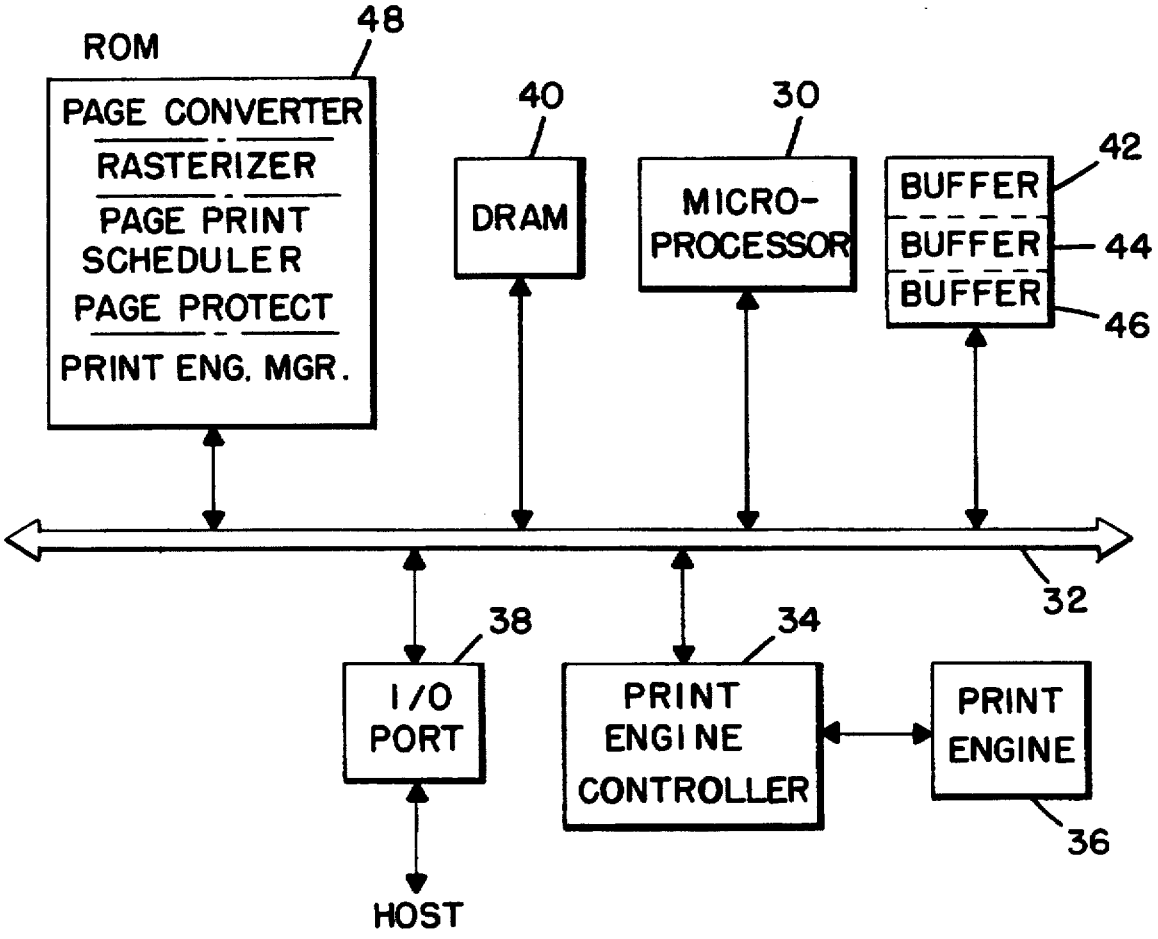
FIG. 2 is a high level block diagram of a printer that embodies the invention.

Turning now to FIG. 2, a high level block diagram is shown of a page printer incorporating the invention. The page printer is controlled by a microprocessor 30 which communicates with other elements of the system via bus 32. A print engine controller 34 and associated print engine 36 connect to bus 32 and provide the print output capability for the page printer. Print engine 36 is preferably a laser printer that employs an electrophotography drum imaging system, well known in the art.

An I/0 port 38 provides communications between the page printer and a host computer and receives page descriptions from the host for processing within the page printer. A dynamic random access memory (DRAM) 40 provides random access memory for the page printer. A portion of DRAM 40 (shown separately) includes three, pre-allocated buffers 42, 44 and 46 which are employed during strip processing. A read only memory (ROM) 48 holds firmware which controls the operation of the page printer.

Among the code stored in ROM 48 is the following: a page converter, rasterizer, page print scheduler (includes a page protect feature) and a print engine manager. The page converter firmware converts a page description received from the host to a display command list. As aforestated, each display command defines an object to be printed on the page. The rasterizer firmware converts each display command to an appropriate bit map which is passed to print engine 36 by print engine controller 34 and enables the generation of the text/graphics etc. The page print scheduler firmware controls the sequencing and transfer of page strip buffers to print engine controller 34. Within the page print scheduler is page protection firmware which assures that print overruns do not occur during the processing of a page. The print engine manager firmware controls the operation of print engine controller 34 and, in turn, print engine 36.

The operation of the page printer shown in FIG. 2 commences when it receives a page description from a host computer via I/0 port 38. The page description is placed in DRAM 40 and microprocessor 30 then accesses the description, line by line, and builds a display command list using the page converter firmware in ROM 48. The display command list is a set of commands that describe what must be printed and form an intermediate description of the page that will subsequently be converted to a rasterized bit map and utilized by print engine 36. As the display command list is being produced, the display commands are sorted by location on the page and allocated to page strips.

During the time that the page description is being converted to display commands, each command is examined and its rasterization execution time (RET) is found. When the display commands are then positionally sorted and assigned to the various page strips, the RET's for all display commands assigned to each strip are summed to derive a total RET for each strip.

RET is the time needed to render an object from its display command form into a rasterized form. It is known that rasterization time is related to the size of an object and it has been further found that the rasterization time can be found by summing three separate coefficients. The first coefficient is termed "overhead" and is the fixed amount of time microprocessor 30 spends on an object, independent of its size. The second coefficient is "height cost" which is proportional to the object's height, independent of its width. The third coefficient of this sum is termed "word cost" and is proportional to the number of words written to the destination bit map strip, independent of the object's height. The relationship between an object's actual RET and the method of predicting the RET is dependent upon the rasterization algorithm used and the execution speed of the microprocessor. Thus additional coefficients may be deemed useful, dependent upon the specifically used rasterization algorithms.

RET for all objects (e.g., vectors, trapezoids, bit maps) can thus be determined, each with a different set of coefficients. Once the coefficients are determined for various expected objects, they are stored in a table and subsequently accessed when the type and dimensions of an object to be printed become known. Thus, RET for any display command can be readily determined by a table lookup of precalculated coefficients followed by a calculation of the sum of the coefficients, or modified by the objects size.

As can now be seen, the page printer, during page composition, computes the size of an object when placing it's display command in the list. Given the object's size and its complexity coefficients, the total time needed to render that object into rasterized form is added to the RET of objects already contained within the list. Once page composition is complete, a total RET needed to render the entire display list is known, as is the time required to render each individual page step.

At this point, the composed page is turned over for printing to a page print scheduler contained in ROM 48. The page print scheduler firmware contains a page protection sub-routine which prevents print overruns as a result of one or more strips requiring more rasterization time than PSRT.

A method for preventing print overruns, that is not the most preferred, is to identify which page strip has an RET that exceeds the PSRT threshold for the page printer, and then prerasterizing those strips that exceed the threshold. The preferred method for preventing overruns takes adjacent strip complexities into account.

Since a page is processed from top to bottom, the time when a page strip is ready for printing is affected by the time spent on prior strips. For example, if page strip 4 is nearly empty, the processor can spend almost twice its normal time to rasterize strip 5 before print engine 36 will require it. Thus, a "too complex" threshold for a page strip can actually be higher than the PSRT value, previously derived. In the event that a page strip exceeds the "too complex" threshold, (taking into account the time available for rasterization that has been unused by adjacent strips), the complex page strip is prerasterized so that it is immediately available for transfer to print engine 36, with no intermediate processing.

When a strip is prerasterized, its complete rasterization time is made available to an adjacent page strip, so that a considerably more complex page strip can be rasterized without exceeding the "too complex" threshold. This page protection method is thus adaptive and continually adjusts the threshold for individual page strip rasterization by considering the complexity of adjacent page strips.

Figure 3:
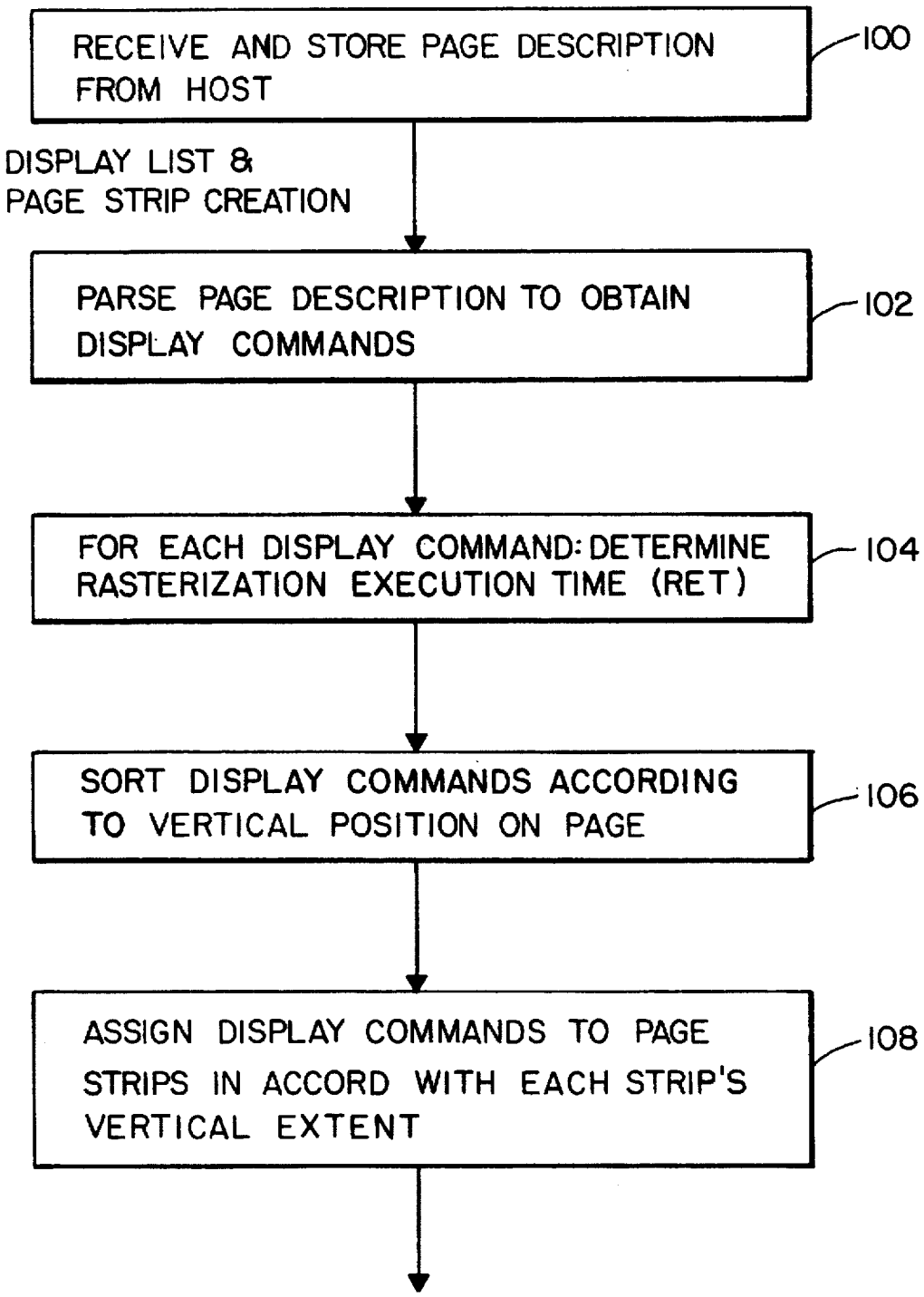
FIGS. 3–5 show a high level flow diagram that embody the method of the invention.
Figure 4:
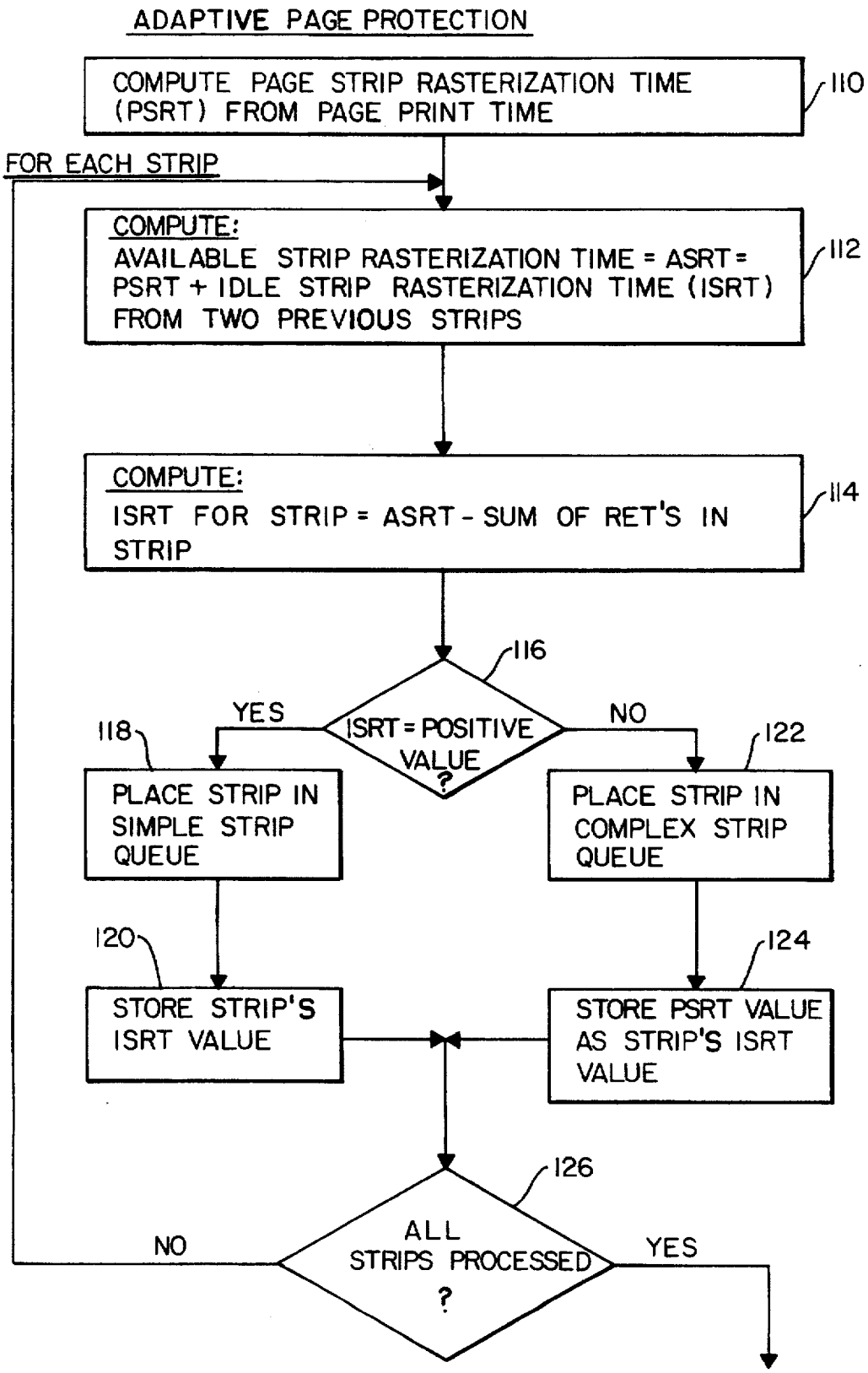
Figure 5:
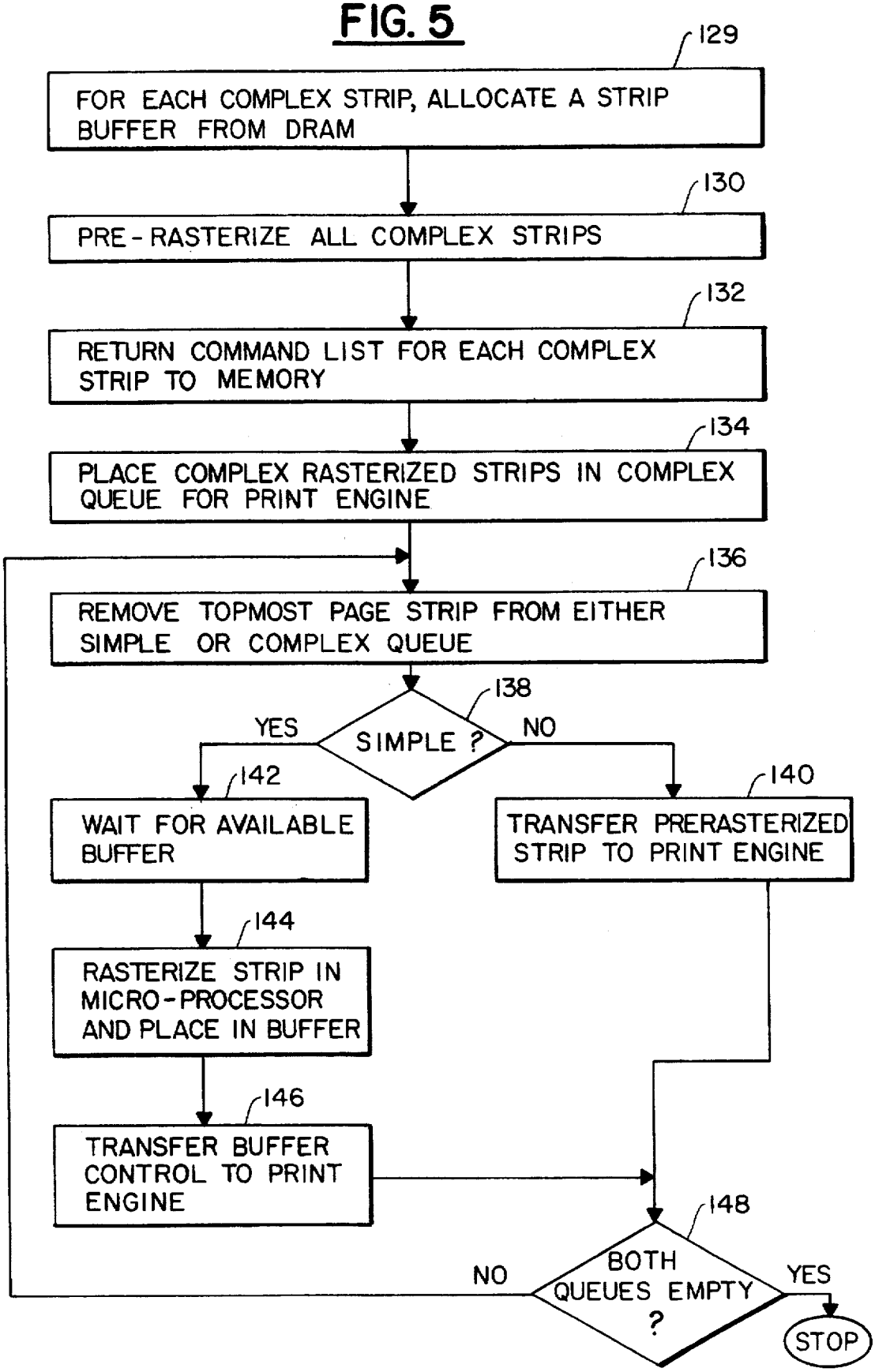

Turning now to FIGS. 3–5, the detailed operation of the invention will be described in conjunction with the block diagram of FIG. 2. Initially, the page printer receives and stores a page description from the host computer (box 100). Microprocessor 30 then calls the page converter code from ROM 48 that, in turn, parses the page description and creates a display command list therefrom (box 102). Each display command is examined and its rasterization execution time (RET) is found (box 104). The display commands are then sorted in accordance with their vertical position on the page (box 106), and assigned to page strips in accordance with each page strip's vertical extent (box 108).

At this stage, the adaptive page protection subroutine commences (see FIG. 4) by initially finding the page strip rasterization time (PSRT) constant. PSRT may be either precomputed and stored or be calculated by dividing the page print time by the number of page strips (box 110). A page strip is then accessed and its available strip rasterization time (ASRT) is calculated. ASRT is equal to PSRT plus available idle strip rasterization time (ISRT) from at least one previous strip. The determination of the number of strips to consider in this calculation is dependent upon the number of page strip buffers which have been preallocated for use by print engine 36.

In the circuit of FIG. 2, three page strip buffers 42, 44 and 46 are preallocated. During the print process, each receives a page strip containing display commands, which strip is then converted to a rasterized image and passed to print engine controller 34 and print engine 36. Only after one of buffers 42, 44 or 46 becomes available, can a new page strip be inserted. The total PSRT for buffers 42, 44, 46 is 3 (PSRT), however, as will be hereinafter understood, that time is allocated to the individual page strips within buffers 42, 44, 46 in an adaptive manner. While three page strip buffers are shown in FIG. 2, it is to be understood that other numbers of page strip buffers may be chosen (e.g. 2, 4, etc.) dependent upon print engine efficiency, memory availability, etc.

Returning to FIG. 4, available page strip rasterization time (ASRT) is calculated by adding to PSRT, the idle page strip rasterization time (ISRT) from a pair of previous page strips (box 112). ASRT will never be greater than x(PSRT) where x is one less than the number of strip buffers. ISRT is now computed for the particular page strip being processed, by subtracting from the computed value of ASRT, determined in box 112, the sum of rasterization execution times (RET) for display commands in the page strip. This value indicates whether excess rasterization time will remain for allocation to another page strip or whether, for the page strip being processed, ASRT will be insufficient to accommodate RET for the page strip.

As shown in decision box 116, if the calculated value for ISRT is positive (indicating that excess rasterization time will remain after the display commands in the page strip being processed have been rasterized), then the routine proceeds to box 118 where the page strip is placed in a "simple" strip queue. The ISRT value for the "simple" strip is then stored (box 120).

If, decision box 116 indicates that the ISRT value is not positive, then the page strip is placed in a "complex" strip queue (box 122) and PSRT is stored as that page strip's ISRT value (box 124). The value of PSRT is stored for the complex page strip because the page strip will be prerasterized and, in effect, no rasterization time will be required when the time arrives to pass the page strip to the print engine. Thus, its PSRT value can be allocated to another page strip.

At this point, the procedure continues to decision box 126 where a determination is made as to whether all page strips on a page have been processed. If not, the procedure recycles to box 112 and continues.

If all page strips have been processed, the procedure continues to FIG. 5 a strip buffer is allocated for each complex strip from DRAM 40 (box 129). Then all "complex" page strips in the complex strip queue are then prerasterized (box 130). The command list for each complex page strip that has been rasterized is returned to memory as it will no longer be required (box 132). The rasterized complex page strips are then placed in a complex queue and await use by print engine 36.

At this point, page print scheduler firmware begins to feed the page strips to print engine controller 34. It initiates this action by removing the top-most page strip identifier from either the simple or complex queue (box 136). If the page strip is complex (decision box 138), the prerasterized page strip is immediately transferred from DRAM 40, where it is resident, to print engine controller 34, bypassing buffers 42, 44 and 46. On the other hand, if the page strip is determined to be from the simple queue, the system waits until a strip buffer becomes available (box 142). When a buffer becomes available, the simple page strip (containing display commands) is inserted therein and its commands are rasterized by microprocessor 30, using rasterizer firmware from ROM 48 (box 144). As indicated above, the time available for rasterizing the simple page strip is ASRT as determined in box 112.

Once rasterization of the simple page strip is completed, control of the strip buffer is transferred to print engine controller 34, which then accesses the rasterized simple page strip (box 146). At this point, the program determines whether both queues are empty (decision box 148), and if not, it recycles back to box 136 and continues as shown in FIG. 5. If both queues are empty, then an entire page has been passed to print engine controller 34 and the routine stops until a next page is to be processed. As can be seen, the precalculation of RET's and allocation of ISRT amongst page strips in the page strip buffers enables print overruns to be avoided and provides adaptive rasterization time allocation.

It should be understood that the foregoing description is only illustrative of the invention. Various alternatives and modifications can be devised by those skilled in the ar without departing from the invention. While the invention has been described in a laser printer environment, it is equally applicable to other types of printers which may experience print overrun type problems (e.g. ink jet printers). Accordingly, the present invention is intended to embrace all such alternatives, modifications and variances which fall within the scope of the appended claims.

We claim:

1. In a page printer capable of printing m pages per unit of time, each page divided into n page strips, each page strip allocated a page strip rasterization time (PSRT), a method for assuring that a print mechanism has a rasterized page strip waiting to be printed when a previous page strip has been printed, the method comprising the steps of:

a) determining rasterization execution time (RET) for display commands in each page strip;

b) determining, for a selected page strip, if its RET exceeds the sum of PSRT and at least idle strip rasterization time (ISRT) for a previous page strip, where ISRT=PSRT less RET for said [prior] *previous* strip;

c) pre-rasterizing said selected page strip if RET for said selected page strip exceeds said sum, and arranging it in a first queue;

d) arranging said selected page strip in a second queue if its RET does not exceed said sum; and e) transferring page strips from said queues to a print mechanism and rasterizing strips from the second queue in the process of such transfer.

2. The method as defined in claim 1 where, for a page strip arranged in said first queue, a value ISRT=PSRT is stored for allocation to another page strip.

3. The method as defined in claim 2 wherein said page printer has less page strip buffers than said n page strips, and wherein step (e) further comprises:

placing page strips from said second queue in said page strip buffers, and transferring control of a buffer to said print mechanism once a page strip therein has been rasterized.

4. The method as recited in claim 3, wherein ISRT is determined based on x(PSRT-RET) where x is one less than the total number of page strip buffers, whereby available rasterization time is increased.

5. The method as recited in claim 4 wherein step (a) includes the step of accessing stored values indicative of the time required to rasterize an object, said stored values dependent upon said objects kind, height and width.

6. The method as recited in claim 5 wherein said rasterization occurs under control of a processor, with prerasterized strips placed in a non-buffer store, while strips rasterized in step (e) are placed in a said buffer, a said prerasterized strip passing directly to said print mechanism, bypassing said buffers.

7. In a page printer capable of printing m pages per unit of time, each page is divided into n page strips, each page strip allocated a page strip rasterization time (PSRT) [equal to m/n], the combination comprising:

means for deriving a rasterization execution time (RET) for display commands in each page strip on a page;

means for determining, for a selected page strip, if its RET exceeds the sum of PSRT and at least a prior strip's idle strip rasterization time (ISRT), where ISRT equals PSRT less RET for said prior strip;

rasterizing means for pre-rasterizing any said selected strip whose RET exceeds said sum and arranging it in a first queue;

means for arranging any selected strip whose RET does not exceed said sum in a second queue;

scheduling means for transferring strips from said queues to a print mechanism and for enabling a rasterizing means to rasterize from the second queue in the process of such transfer.

8. The apparatus as defined in claim [1] *7*, wherein said rasterizing means, for any prerasterized page strip, stores a value of ISRT for said page strip which is equal to PSRT whereby said ISRT value becomes available for allocation to another page strip.

9. The apparatus as recited in claim 8, wherein said means for determining employs the sum of ISRT for at least two page strips.

10. The apparatus as recited in claim 9, further comprising at least three page strip buffers, each said page strip in said second queue being placed in a page strip buffer and rasterized therein before being passed to said print mechanism.

11. The apparatus as recited in claim 10, wherein said scheduling means transfers prerasterized page strips directly to said print mechanism, bypassing said print buffers.

*12. The apparatus as recited in claim 7 wherein PSRT is a page print time/n.*

*13. In a page printer capable of printing m pages per unit of time, each page divided into n page strips, each page strip allocated a page strip rasterization time (PSRT), a method for assuring that a print mechanism has a rasterized page strip waiting to be printed when a previous page strip has been printed, the method comprising the steps of:*

*a) determining rasterization execution time (RET) for display commands in each page strip;*

*b) determining, for a selected page strip, if its RET exceeds PSRT;*

*c) pre-rasterizing said selected page strip if RET for said selected page strip exceeds PSRT and arranging it in a first queue;*

*d) arranging said selected page strip in a second queue if its RET is less than or equal to PSRT; and*

*e) transferring page strips from said queues to a print mechanism and rasterizing strips from the second queue in the process of such transfer.*

*14. In a page printer capable of printing m pages per unit of time, each page divided into n page strips, each page strip allocated a page strip rasterization time (PSRT), the combination comprising:*

*means for deriving a rasterization execution time (RET) for display commands in each page strip on a page;*

*means for determining, for a selected page strip, if its RET exceeds PSRT;*

*rasterizing means for pre-rasterizing any said selected strip whose RET exceeds said PSRT and arranging it in a first queue;*

*means for arranging in a second queue any selected strip whose RET is less than or equal to PSRT; and*

*scheduling means for transferring strips from said queues to a print mechanism and for enabling a rasterizing means to rasterize strips from the second queue in the process of such transfer.*

* * * * *